(12) United States Patent
Nay

(10) Patent No.: US 10,957,284 B1
(45) Date of Patent: Mar. 23, 2021

(54) CHANGEABLE HOLIDAY DISPLAY

(71) Applicant: Kristi Nay, Fort Collins, CO (US)

(72) Inventor: Kristi Nay, Fort Collins, CO (US)

( * ) Notice: Subject to any disclaimer, the term of this patent is extended or adjusted under 35 U.S.C. 154(b) by 0 days.

(21) Appl. No.: 16/667,906

(22) Filed: Oct. 30, 2019

(51) Int. Cl.
*G09G 5/37* (2006.01)
*G09G 5/02* (2006.01)

(52) U.S. Cl.
CPC .............. *G09G 5/37* (2013.01); *G09G 5/02* (2013.01); *G09G 2354/00* (2013.01); *G09G 2370/08* (2013.01)

(58) Field of Classification Search
CPC ................................. G09G 5/37; G09G 5/02
See application file for complete search history.

(56) References Cited

U.S. PATENT DOCUMENTS

| | | | | |
|---|---|---|---|---|
| 2,284,309 A * | 5/1942 | Tschopp | ................... | G09F 13/26 40/545 |
| 3,680,237 A * | 8/1972 | Finnerty, Sr. | ........... | G09F 13/22 40/544 |
| 5,832,642 A * | 11/1998 | Dalton | ................. | G02B 6/0091 40/546 |
| 6,057,814 A * | 5/2000 | Kalt | ....................... | G02B 26/02 345/31 |
| 6,271,814 B1 | 8/2001 | Kaoh | | |
| 6,361,187 B1 * | 3/2002 | Adams | .................. | A47G 33/06 362/145 |
| 6,536,727 B1 * | 3/2003 | Limber | ..................... | F16B 2/22 248/227.1 |
| D516,626 S | 3/2006 | Hearn | | |
| 9,506,609 B1 * | 11/2016 | Groves | .................. | F21V 15/01 |
| 10,339,796 B2 | 7/2019 | Bora et al. | | |
| 2001/0053083 A1 * | 12/2001 | Limber | .................. | G09F 9/302 362/565 |
| 2002/0163806 A1 * | 11/2002 | Adams | ................... | A47G 33/08 362/418 |
| 2006/0164333 A1 | 7/2006 | Robertson | | |
| 2007/0041188 A1 * | 2/2007 | Angelos | ..................... | F21S 9/03 362/249.01 |
| 2007/0114340 A1 * | 5/2007 | Adams | ...................... | F16L 3/13 248/72 |
| 2008/0141571 A1 * | 6/2008 | Kottwitz | .................. | G09F 9/33 40/605 |
| 2010/0108442 A1 * | 5/2010 | Ballantyne | .......... | E04G 21/3261 182/129 |
| 2010/0110668 A1 * | 5/2010 | Marlonia | ............ | F21V 23/0435 362/152 |
| 2013/0014448 A1 * | 1/2013 | Jones | ..................... | A47G 7/045 52/11 |
| 2014/0062857 A1 * | 3/2014 | She | ....................... | G06F 3/0486 345/156 |
| 2014/0139548 A1 * | 5/2014 | Byers | ................. | G06Q 30/0281 345/619 |
| 2014/0335910 A1 * | 11/2014 | Wang | ..................... | H05B 47/12 455/550.1 |

(Continued)

*Primary Examiner* — Sarah Lhymn

(57) ABSTRACT

An illustrated view of an exemplary changeable holiday display for displaying lighted celebrations of holidays is presented. The changeable holiday display is useful for providing programmable displays of events such as holidays, celebrations, etc. without having to remove the display after each event. The changeable holiday display is useful for being updatable to a new display of event and programmable to add and edit events as is desired.

11 Claims, 2 Drawing Sheets

(56) References Cited

U.S. PATENT DOCUMENTS

| | | | |
|---|---|---|---|
| 2015/0187238 A1* | 7/2015 | Hall | G09G 3/006 40/544 |
| 2017/0183874 A1* | 6/2017 | Holt | E04D 13/00 |
| 2018/0206300 A1* | 7/2018 | Farnsworth | H05B 45/20 |
| 2019/0264866 A1* | 8/2019 | Raab | F21V 21/096 |

* cited by examiner

CHANGEABLE HOLIDAY DISPLAY

FIELD OF THE INVENTION

This invention relates to displays. More particularly, it relates displaying of holiday messages and images.

BACKGROUND

A holiday is a day set aside by custom or by law on which normal activities, especially business or work including school, are suspended or reduced. Generally, holidays are intended to allow individuals to celebrate or commemorate an event or tradition of cultural or religious significance. Holidays may be designated by governments, religious institutions, or other groups or organizations. The degree to which normal activities are reduced by a holiday may depend on local laws, customs, the type of job held or personal choices.

The concept of holidays often originated in connection with religious observances. The intention of a holiday was typically to allow individuals to tend to religious duties associated with important dates on the calendar. In most modern societies, however, holidays serve as much of a recreational function as any other weekend days or activities.

In many societies there are important distinctions between holidays designated by governments and holidays designated by religious institutions. For example, in many predominantly Christian nations, government-designed holidays may center on Christian holidays, though non-Christians may instead observe religious holidays associated with their faith. In some cases, a holiday may only be nominally observed. For example, many Jews in the Americas and Europe treat the relatively minor Jewish holiday of Hanukkah as a "working holiday", changing very little of their daily routines for this day.

The word holiday has differing connotations in different regions. In the United States the word is used exclusively to refer to the nationally, religiously or culturally observed day(s) of rest or celebration, or the events themselves, whereas in the United Kingdom and other Commonwealth nations, the word may refer to the period of time where leave from one's duties has been agreed, and is used as a synonym to the US preferred vacation. This time is usually set aside for rest, travel or the participation in recreational activities, with entire industries targeted to coincide or enhance these experiences. The days of leave may not coincide with any specific customs or laws. Employers and educational institutes may designate 'holidays' themselves which may or may not overlap nationally or culturally relevant dates, which again comes under this connotation, but it is the first implication detailed that this article is concerned with.

A marquee is most commonly a structure placed over the entrance to a hotel, theatre, casino, train station, or similar building. It often has signage stating either the name of the establishment or, in the case of theatres, the play or movie and the artist(s) appearing at that venue. The marquee is sometimes identifiable by a surrounding cache of light bulbs, usually yellow or white, that flash intermittently or as chasing lights.

Electronic signage (also called electronic signs or electronic displays) are illuminant advertising media in the signage industry. Major electronic signage includes fluorescent signs, HID (high intensity displays), incandescent signs, LED signs, and neon signs. Besides, LED signs and HID are so-called digital signage.

Signage is the design or use of signs and symbols to communicate a message to a specific group, usually for the purpose of marketing or a kind of advocacy. A signage also means signs collectively or being considered as a group. The term signage is documented to have been popularized in 1975 to 1980.

Signs are any kind of visual graphics created to display information to a particular audience. This is typically manifested in the form of wayfinding information in places such as streets or on the inside and outside buildings. Signs vary in form and size based on location and intent, from more expansive banners, billboards, and murals, to smaller street signs, street name signs, sandwich boards and lawn signs. Newer signs may also use digital or electronic displays.

The main purpose of signs is to communicate, to convey information designed to assist the receiver with decision-making based on the information provided. Alternatively, promotional signage may be designed to persuade receivers of the merits of a given product or service. Signage is distinct from labeling, which conveys information about a particular product or service.

Many people put up electronic displays to celebrate holidays. These signs are removed after the holiday and stored until the next holiday. Another display is used for the next holiday. This is time consuming, requires usage of a lot of space and extra effort to remove one display for another display, etc.

In light of the foregoing, there is a need for a device that can display various holiday celebrations. The device should have the capabilities to be "programmed" via a remote computing device and can be display year round.

DETAILED DESCRIPTION

Figure 1:
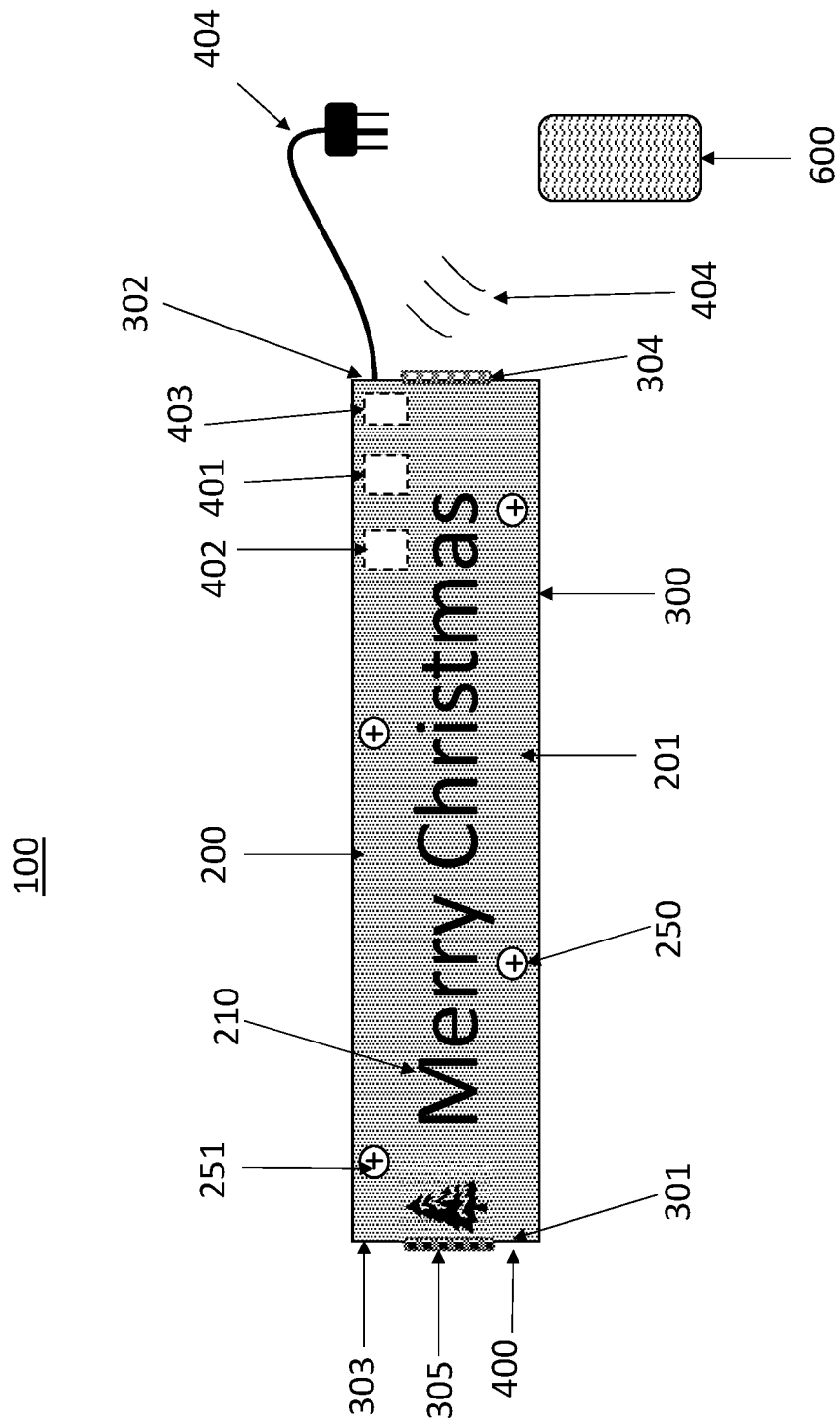
FIG. 1 is an illustrated view of an exemplary changeable holiday display.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring to FIG. 1, an illustrated view of an exemplary changeable holiday display 100 for displaying lighted celebrations of holidays is presented. The changeable holiday display 100 is useful for providing programmable displays of events such as holidays, celebrations, etc. without having to remove the display after each event. The changeable holiday display 100 is useful for being updatable to a new display of event and programmable to add and edit events as is desired.

The changeable holiday display 100 is preferably five (5) inches in height, however other heights are hereby contemplated, including, but not limited to, three (3) inches, seven (7) inches, etc. The changeable holiday display 100 is preferably three (3) feet in length, however other lengths are hereby contemplated, including, but not limited to, two (2) feet, four (4) feet, etc. The changeable holiday display 100 is preferably rectangular in shape, however other shapes are hereby contemplated, including but not limited to, square, oblong, trapezoidal, etc.

The changeable holiday display 100 has a display 200, a frame 300, an interior 400 and a plurality of predrilled coupling openings 250. The display 200 of the changeable holiday display 100 is coupled on an inside 301 of the frame 300. The display 200 of the changeable holiday display 100 is preferably a matrix of lamps 201, however other displays are hereby contemplated, including but not limited to, neon, lighting panels, etc. The lamps are preferably light-emitting diodes (LED) lamps, however other types of lamps are hereby contemplated, including but not limited to, Neon, liquid crystal display (LCD), halogen, etc.

The predrilled coupling openings 250 of the display 200 are useful for coupling the changeable holiday display 100 to a structure such as a house. The predrilled coupling openings 250 receive a coupling device 251 such that the coupling device 251 securely couples the changeable holiday display 200 to the structure. The coupling device 251 are preferably Philips screws, however other coupling devices are hereby contemplated, including, but not limited to, lag bolts, nails, etc.

The interior 400 of the changeable holiday display 100 has a microcomputer 401, a transceiver 402 and a power source 403. The power source 403 is preferably ac/dc current, however other types of sources of power are hereby contemplated, including, but not limited to, rechargeable battery, disposable battery, solar, etc. When the power source 403 is ac/dc current, then the changeable holiday display 100 has a power cord 404 for receiving electrical current from an electrical plug (not shown). The power source 403 is electrically coupled to the display 200 of changeable holiday display 100.

The microcomputer 401 of the interior 400 of changeable holiday display 100 stores the information regarding a message to be displayed. The microcomputer 401 further decodes signaling received by the transceiver 402. The transceiver 402 receives messages wirelessly utilizing signaling protocols 404. The signaling protocols are preferably IEEE 802.15) Bluetooth®), however other signaling protocols are hereby contemplated, including, but not limited to, IEEE 802.11) WiFi®), 3GPP2 (5G wireless), etc.

The transceiver 402 is electrically coupled to the power source 403 and further communicatively coupled to the microcomputer 401. The microcomputer 401 is electrically coupled to the power source 403.

An app on a computing device 600 is useful to program and select a determined program to be displayed on changeable holiday display 100. The programs for display may be any type of message, such as, but not limited to, "Merry Christmas", "Happy Thanksgiving", "Happy Birthday America", "Congratulations Graduate", "Happy Retirement", "Congratulations on the New Baby", etc. The computing device 600 is preferably a smart phone, however other types of computing devices are hereby contemplated, including, but not limited to, tablet, laptop, desktop computer, etc.

The transceiver 402 receives a signal from the computing device 600. The transceiver 402 transmits a received signaling protocol 404 to the computing device 600 to acknowledge receipt of the signal protocol 404. The transceiver 402 communicates the signaling protocol 404 received from the computing device 600 to the microcomputer 401. The microcomputer 401 decodes the signaling protocol 404 and signals the display a pattern of lights 210 on the display 200 to reflect the selected program at the computing device 600. Further, the signaling protocol 404 received may also be a change in color of the pattern of lights 210 on the display 200.

The frame 300 has a first side 302 and a second side 303. A first connector 304 is securely coupled to the first 302 of the frame 300 and a second connector 305 is coupled to the second side 303 of the frame 300 thereby allowing for more than one changeable holiday displays 100 to be coupled together. The first connector 304 is preferably a snap connector, however other types of connectors are hereby contemplated, including, but not limited to, Velcro® strips, clips, etc. The second connector 305 is preferably a snap connector, however other types of connectors are hereby contemplated, including, but not limited to, Velcro® strips, clips, etc.

Figure 2:
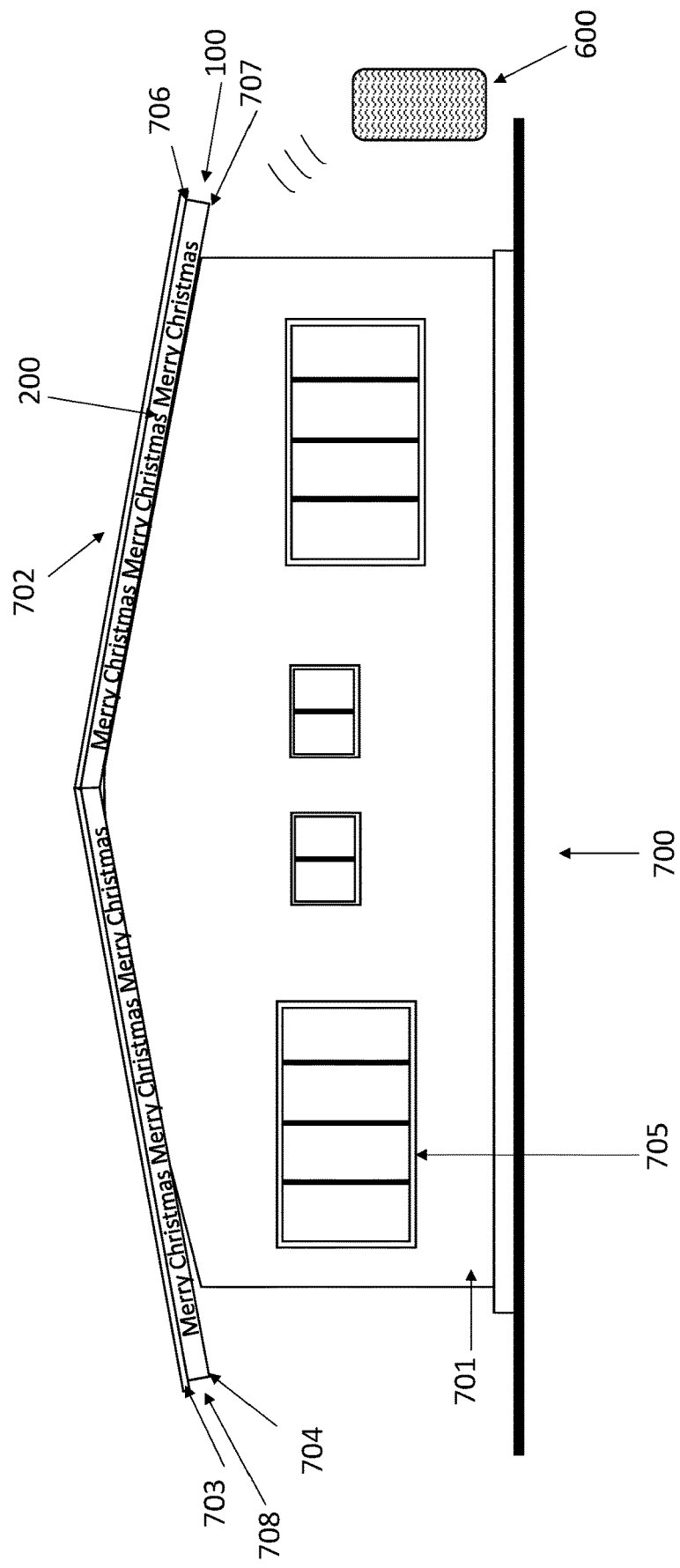
FIG. 2 is an illustrated view a use of the changeable holiday display shown in FIG. 1.

Moving now to FIG. 2, an illustrated view of a use of the changeable holiday display 100 is presented.

A house 700 has a front 701, a roof 702, an eave 703, a gutter 704 and a window 705. The gutter 704 is coupled to a first edge 706 of the roof 702 of the front 701 of the house 700. The eave 703 is configured to be at a bottom 707 of a soffit 708 coupled to the first edge 706 of the roof 702 of the front 701 of the house 700.

The changeable holiday display 100 is coupled to the eave 703 of the house 700 by inserting the coupling devices 251 (See FIG. 1) through the coupling openings 250 (See FIG. 1) of the display 200 and securing the coupling devices 251 (See FIG. 1) into the eave 703 of the house 700. When the changeable holiday display 100 is coupled to the eave 703, the changeable holiday display 100 is preferably five (5) inches in length, however other lengths are hereby contemplated, including, but not limited to, four (4) inches, six (6) inches, etc.

Alternatively, the changeable holiday display 100 is coupled to the gutter 704 of the house 700 by inserting the coupling devices 251 (See FIG. 1) through the coupling openings 250 (See FIG. 1) of the display 200 and securing the coupling devices 251 (See FIG. 1) into the gutter 704 of the house 700. When the changeable holiday display 100 is coupled to the gutter 704, the changeable holiday display 100 is (See FIG. 1) preferably three (3) inches in length, however other lengths are hereby contemplated, including, but not limited to, two (2) inches, four (4) inches, etc.

Patterns and colors displayed on the changeable holiday display 100 is controlled by the computing device 600. The computing device 600 signals to the computing device 204 (See FIG. 1) the selected program. The computing device 204 (See FIG. 1) then actuates the lamps of the display 200 to reflect the program chosen.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A changeable holiday display for displaying lighted celebrations of holidays, the holiday display consisting of:
    a frame, the frame having a first side and a second side;
    a display;
    an interior, the interior having a microcomputer, a transceiver and a power source, wherein the power source being electrically coupled to the microcomputer, the transceiver and the display, wherein the holiday display having a power cord, wherein the power cord being coupled to the power source;
    an app, the app being accessible on a computing device, wherein the computing device sending a signaling protocol received by the transceiver to indicate to the microcomputer a pattern for the display;
    a plurality of coupling openings, wherein a plurality of coupling devices being coupled to a structure inserted into the coupling openings; and
    a first connector, the first connector being for connecting more than one holiday display, wherein the first connector being coupled to the first side of the frame; and
    a second connector, the second connector being for connecting more than one holiday display, wherein the second connector being coupled to the second side of the frame.

2. The holiday display of claim 1, wherein the holiday display having a height being five (5) inches.

3. The holiday display of claim 1, wherein the holiday display having a length being three (3) inches.

4. The holiday display of claim 1, wherein the holiday display being made of a plastic material.

5. The holiday display of claim 1, wherein the power source being ac/dc.

6. The holiday display of claim 1, wherein the holiday display being coupled to an eave of the structure.

7. The holiday display of claim 1, wherein when the holiday display being coupled to a gutter of the structure.

8. The holiday display of claim 1, wherein a color of the pattern being changed.

9. The holiday display of claim 1, wherein the pattern is a message.

10. The holiday display of claim 9, wherein the message being "Merry Christmas".

11. A changeable holiday display for displaying lighted celebrations of holidays, the holiday display consisting of:
    a frame, the frame having a first side, a second side and an interior, wherein the frame having a height being five (5) inches, wherein the frame having a length being three (3) inches;
    a display;
    the interior having a microcomputer, a transceiver and a power source, the holiday display having a power cord, the power cord being coupled to the power source, wherein the power source being electrically coupled to the microcomputer, the transceiver and the display, wherein the power source being ac/dc;
    an app, the app being accessible on a computing device, wherein the computing device sending a signaling protocol received by the transceiver to indicate to the microcomputer a pattern for the display, wherein the pattern being one of: a color, a message, wherein when the pattern being a color, the color being changeable, and wherein when the pattern being a message, the message being "Merry Christmas";
    a plurality of coupling openings, wherein a plurality of coupling devices being coupled to a structure inserted into the coupling openings; and
    a first connector, the first connector being for connecting more than one holiday display, wherein the first connector being coupled to the first side of the frame; and
    a second connector, the second connector being for connecting more than one holiday display, wherein the second connector being coupled to the second side of the frame, wherein the holiday display being made of a plastic material, when the holiday display being coupled to an eave of the structure, the holiday display having a height being five (5) inches, and wherein when the holiday display being coupled to a gutter of the structure, the holiday display having a length being three (3) inches.

* * * * *